United States Patent
Okamoto et al.

(10) Patent No.: US 8,985,303 B2
(45) Date of Patent: Mar. 24, 2015

(54) CONVEYING DIRECTION SWITCHING APPARATUS

(75) Inventors: Masaaki Okamoto, Gumma (JP); Atsushi Takada, Gumma (JP)

(73) Assignee: Oki Electric Industry Co., Ltd., Tokyo (JP)

(*) Notice: Subject to any disclaimer, the term of this patent is extended or adjusted under 35 U.S.C. 154(b) by 0 days.

(21) Appl. No.: 13/991,164

(22) PCT Filed: Apr. 18, 2012

(86) PCT No.: PCT/JP2012/060482
§ 371 (c)(1),
(2), (4) Date: Jun. 1, 2013

(87) PCT Pub. No.: WO2013/014894
PCT Pub. Date: Jan. 31, 2013

(65) Prior Publication Data
US 2013/0248322 A1    Sep. 26, 2013

(30) Foreign Application Priority Data
Jul. 26, 2011   (JP) .................................. 2011-163297

(51) Int. Cl.
  B65G 47/52   (2006.01)
  B65H 29/12   (2006.01)
  B65H 29/58   (2006.01)
(52) U.S. Cl.
  CPC ................ *B65G 47/52* (2013.01); *B65H 29/12* (2013.01); *B65H 29/58* (2013.01); *B65H 2404/632* (2013.01); *B65H 2404/693* (2013.01); *B65H 2701/1311* (2013.01); *B65H 2701/1912* (2013.01); *B65H 2404/7431* (2013.01)
  USPC ............ 198/367; 271/303; 235/379; 235/477

(58) Field of Classification Search
  USPC ............. 198/367–367.2; 271/3.19, 303, 225; 235/379, 475–477, 480
  See application file for complete search history.

(56) References Cited

U.S. PATENT DOCUMENTS

| 4,486,015 | A  | * | 12/1984 | Takahashi ...................... 271/305 |
| 7,708,276 | B2 | * | 5/2010 | Okamoto et al. ............. 271/303 |
| 7,862,041 | B2 | * | 1/2011 | Taniguchi ..................... 271/303 |
| 2010/0090397 | A1 | * | 4/2010 | Taniguchi ..................... 271/303 |
| 2010/0213661 | A1 | * | 8/2010 | Fukazawa et al. ............ 271/3.19 |
| 2010/0282571 | A1 | * | 11/2010 | Schimmel et al. ............ 198/367 |
| 2012/0200026 | A1 | * | 8/2012 | Dowling et al. ............. 271/3.19 |
| 2013/0049285 | A1 | * | 2/2013 | Reidhaar ...................... 271/3.19 |

FOREIGN PATENT DOCUMENTS

| CN | 1666943 A | 9/2005 |
| JP | 2008-150173 A | 7/2008 |
| WO | 2011/047590 A1 | 4/2011 |

OTHER PUBLICATIONS

Chinese Office Action issued on Sep. 26, 2014.

* cited by examiner

*Primary Examiner* — Mark A Deuble
(74) *Attorney, Agent, or Firm* — Rabin & Berdo, P.C.

(57) ABSTRACT

A conveying direction switching apparatus includes a first and a second blade assembly, and auxiliary blades rotatably provided at a shaft. The auxiliary blades are arranged between the first and second blade assemblies. When conveying bills, the portions of the bills passing between the first and second blade assemblies in the longitudinal direction of the shaft are guided by the auxiliary blades toward the conveying direction of the bills. Thus, the conveying direction of the medium is appropriately switched.

4 Claims, 12 Drawing Sheets

CONVEYING DIRECTION SWITCHING APPARATUS

TECHNICAL FIELD

The present invention relates to a medium handling apparatus, for example, to an automatic cash transaction apparatus for dealing with bills as a medium, and more specifically to a conveying direction switching apparatus applied to such an apparatus to switch the direction of conveying bills.

BACKGROUND ART

As disclosed in Japanese patent laid-open publication No. 2008-150173, conventional automatic cash transaction apparatuses are provided with a plurality of conveying channels for conveying bills on belts to the components of the apparatus by use of. On the conveying channel, a switching device is positioned to allow the direction of conveying bills to be switched.

The switching device includes a guide member for guiding bills. The guide member holds and pushes bills from one side such that bills can turn at a branch point in a branching direction while going forward. The guide member is positioned beside the belts so as not to interrupt the movement of the belts. Thus, when guiding bills in the branch direction, the guide member fails to partly hold the superficial area of bills. For example, when a bill having its superficial area partly torn is intended to turn in the branch direction, the bill may partly lean out of the conveying channel to be folded or broken, thus not causing a jam.

SUMMARY OF THE INVENTION

It is an object of the present invention to provide a conveying direction switching apparatus that can appropriately switch the direction of conveying a medium without causing conveying mean to interrupt the conveyance of the medium.

The conveying direction switching apparatus according to the present invention includes a primary guide member provided beside a medium conveying channel, such as a belt, and a auxiliary guide member provided on the side of a branching path of the medium conveying channel so as not to interfere with the medium conveying channel.

In accordance with the present invention, an area of the medium that could not be guided by the primary guide member can be guided by the auxiliary guide member in the branch direction. Thus, the medium can be prevented from being folded or broken, or stuck in the branching point or its vicinity.

A conveying direction switching apparatus according to the present invention includes: a shaft rotatable between a first rotational position and a second rotational position; a first guide member fixed to the shaft and including a first guide surface guiding, when the shaft is in a first rotational position, a medium conveyed by a conveying member in a first direction, and a second guide surface guiding, when the shaft is in a second rotational position, the medium in a second direction, different from the first direction, to direct the medium to a branching path; and a second guide member formed on the shaft beside the first guide member in a longitudinal direction of the shaft on a side of the branching path so as not to interfere with the conveying member, the second guide member including a third guide surface guiding, when the shaft is in the second rotational position, the medium in the second direction.

The present invention is advantageously applied not only to machines for dealing as media with sorts of sheet- or strip-like media, e.g. bills, such as an automatic cash transaction machine, an automatic teller machine, a check/deed collection and issuing machine, a bill/check/deed delivery system but also to a copying machine, a fax machine, a printer, a vending machine, a ticket vending machine and the like.

BRIEF DESCRIPTION OF THE DRAWINGS

The objects and features of the present invention will become more apparent from consideration of the following detailed description taken in conjunction with the accompanying drawings in which.

BEST MODE FOR IMPLEMENTING THE INVENTION

Figure 1:
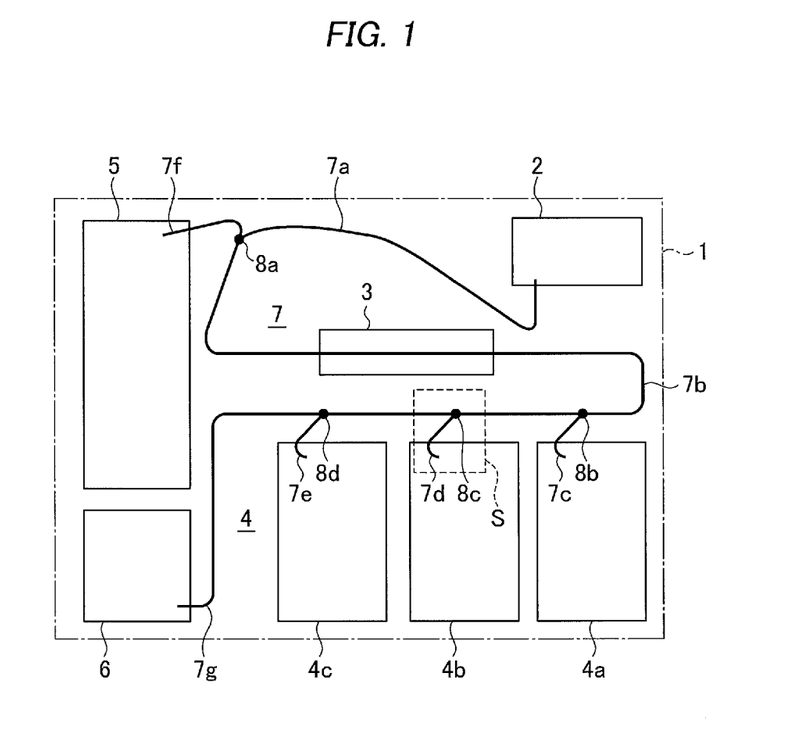
FIG. 1 is a schematic internal side view showing an example of the entire structure of an automatic cash transaction apparatus.

With reference to the accompanying drawings, embodiments of a conveying direction switching apparatus according to the present invention will be described in detail below. FIG. 1 schematically shows an automatic cash transaction apparatus 1 as one example of a medium handling apparatus to which a conveying direction switching apparatus of the invention is applied. The dashed line 1 schematically denotes the casing of the automatic cash transaction apparatus also. The automatic cash transaction apparatus 1 includes a deposit/withdrawal section 2, a bill validator 3, a bill storage 4, a replenishing/collecting cassette 5, a reject box 6, and conveying channels or paths 7 communicating with those elements together. The conveying channels 7 with the instant embodiment are capable of conveying bills in the opposite directions. When depositing, bills inserted into the deposit/withdrawal section 2 are conveyed to the validator 3, which in turn determines the validity and denominations of the bills, which will be stored into the bill storage 4 appropriately for the denominations. When withdrawing, bills carried from the bill storage 4 are discriminated by the validator 3 and accumulated in the deposit/withdrawal section 2.

The bill storage 4 includes, with the instant embodiment, a storage box 4a for storing therein thousand-yen bills, and storage boxes 4b and 4c for storing therein ten-thousand yen bills.

The replenishing/collecting cassette 5 is a detachable, bill storage box for use in replenishing the automatic cash transaction apparatus 1 with bills, or collecting received bills. The reject box 6 is a paper currency storage box for storing therein bills the validator 3 has determined unsuitable for deposit and withdrawal.

The conveying channels or paths 7 include seven conveying channel sections 7a, 7b, 7c, 7d, 7e, 7f and 7g, and four branch sections 8a, 8b, 8c and 8d. The conveying channel section 7a has its one end coupled to the deposit/withdrawal section 2, and its other end coupled to the conveying channel section 7b. The conveying channel section 7b passes the validator 3 to be coupled to the storage 4. Between the conveying channel sections 7a and 7b, the branch section 8a is disposed, to which the conveying channel section 7f leading to the cassette 5 is coupled.

The branch sections 8b, 8c and 8d are positioned on the conveying channel section 7b. The branch section 8b is coupled to the conveying channel section 7c leading to the bill storage box 4a, and the branch section 8c is coupled to the conveying channel section 7d leading to the bill storage 4b. The branch section 8d is coupled to the conveying channel sections 7e and 7g leading to the bill storage box 4c and reject box 6, respectively. The conveying channel section 7g may be adapted to convey bills only in one direction.

Figure 2:
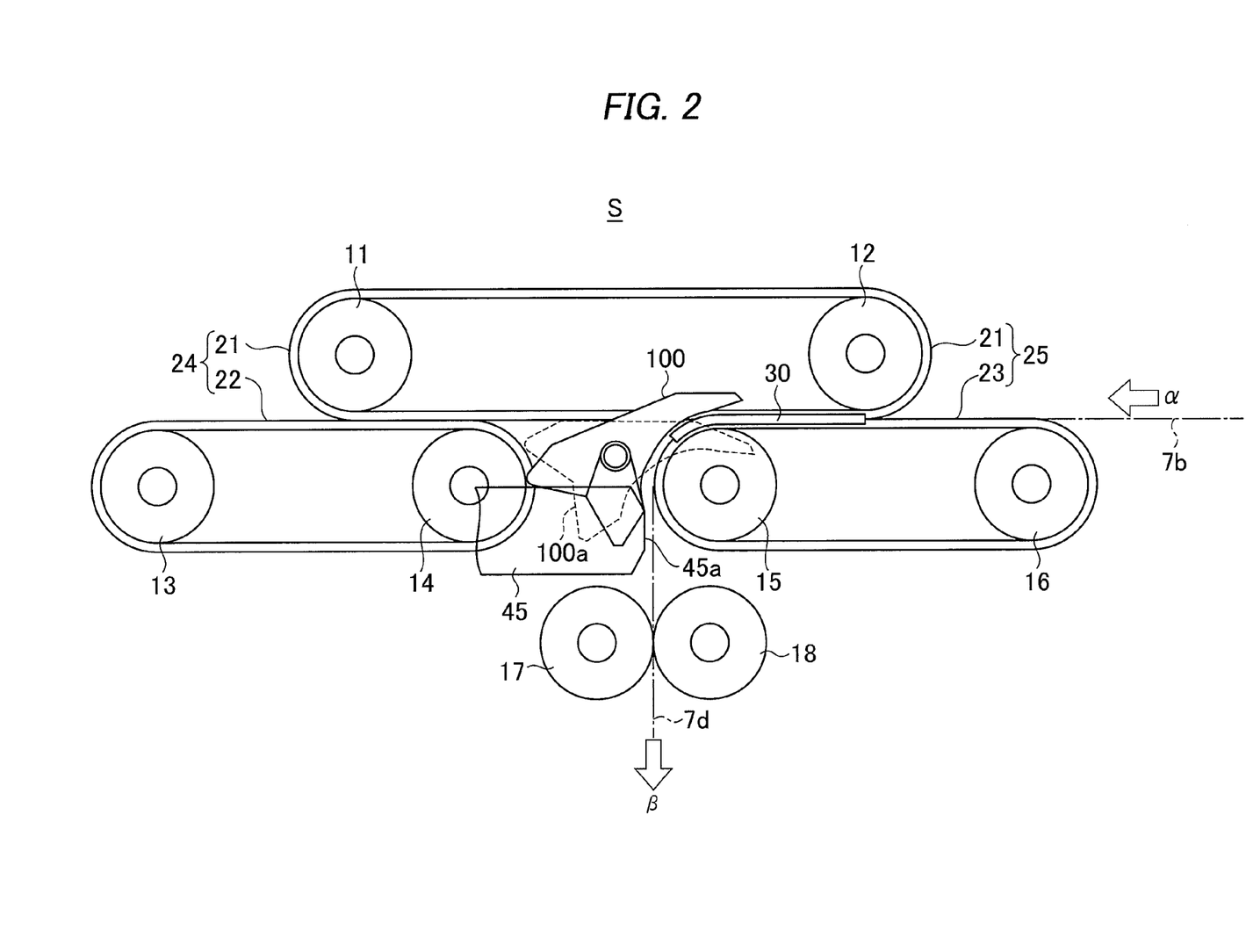
FIG. 2 is a schematic side view showing an example of the structure of a branch section of a conveying channel in the automatic cash transaction apparatus shown in FIG. 1.

One example of the structure of the branch section and its vicinity will be described below with reference to FIG. 2. FIG. 2 shows the structure of the surroundings S of the branch section 8c. The surroundings S include rollers 11 to 18, a switch 100 and a conveying guide 45.

Specifically, as shown in FIG. 2, the roller 12 is disposed on the right side of the roller 11, and the roller 13 is disposed at the lower left of the roller 11. The roller 14 is disposed at the lower right of the roller 11 on the right side of the roller 13. The roller 15 is disposed at the lower left of the roller 12 at the lower right of the roller 14, and the roller 16 is disposed at the lower right of the roller 12 on the right side of the roller 15. The rollers 17 and 18 are arranged under the roller 15 laterally, that is, substantially in parallel to the traveling direction of the conveying channel section 7b. Further in the instant embodiment, in addition to the rollers 11 to 18, there are rollers arranged correspondingly to the rollers 11 to 18 in the depth direction of the sheet of the figure. The latter rollers do not appear in the figure.

In the embodiment shown in FIG. 2, the rollers 11 and 12 carry a belt 21 thereon, the rollers 13 and 14 carry a belt 22 thereon, and the rollers 15 and 16 carry a belt 23 thereon. In the present embodiment, the rollers arranged in parallel, not shown, to the rollers 11 to 16 also carry belts similar to the belts 21 to 23, also not shown.

Figure 3:
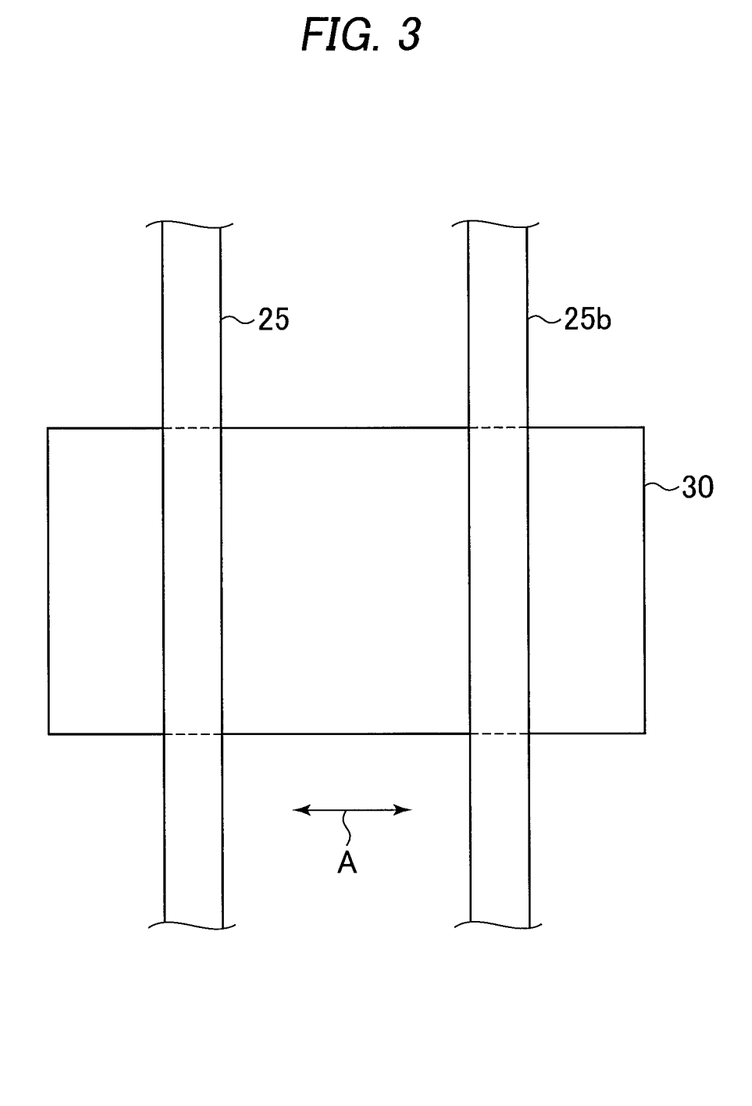
FIG. 3 is a partial top view of the conveying channel for use in describing how a bill is held by a pair of belts shown in FIG. 2.

The belts 21 and 22 form a belt pair 24 for pinching a bill 30 therebetween, and the belts 21 and 23 form a belt pair 25 for pinching the bill 30 therebetween. The belt pairs 24 and 25 serve as a part of the conveying channel section 7b, so that the bill 30 can be conveyed in the direction of an arrow α shown in FIG. 2. The belts hung over the rollers arranged in parallel to the rollers 11 to 16 also form belt pairs similarly to the belts 21 to 23. Thus, in the present embodiment, the bill 30 is held, as shown in FIG. 3, by the belt pair 25 and the belt pair 25b arranged in parallel to the belt pair 25 at two points on both one and other end sides in the longitudinal direction A of the bill 30 to be conveyed toward the switch 100. The belt pair 25b arranged in parallel to the belt pair 25 is located in the depth direction of the sheet of FIG. 2 behind the belt pair 25 located on the front side, and therefore cannot be viewed.

The rollers 17 and 18 of the instant embodiment may be adapted to convey the bill 30 in the direction opposite to the direction indicated by an arrow β, and the belt pair 25 may be adapted to convey the bill 30 in the direction opposite to the direction indicated by an arrow α.

The switch 100 is a switching gate mechanism arranged between the rollers 14 and 15 rotatably between a rotational position or orientation indicated by a solid line 100 in FIG. 2 and a rotational position indicated by a dotted line 100a to cause the rotation to switch the conveying direction of a bill 30. When the switch 100 of the instant embodiment takes the orientation 100 indicated by the solid line, it guides the bill 30 conveyed by the belt pair 25 in the direction of arrow α into the direction of arrow β substantially perpendicular to the direction of arrow α, that is, downward in FIG. 2. In contrast, when the switch 100 takes in the orientation 100a indicated by the dotted line, it continuously guides the bill 30 conveyed in the direction of arrow α by the belt pair 25 to the belt pair 24 in the direction of arrow α. Such rotation of the switch 100 is implemented by a driving mechanism, such as a solenoid, or an electric or hydraulic motor, not shown, operative in response to a driving signal from a control circuit of the apparatus 1.

The conveying guide 45 is a conveying guide mechanism for guiding a bill 30 guided and conveyed by the switch 100 in the direction of arrow β up to the vicinity of the rollers 17 and 18 in the direction of arrow β, and is disposed between the switch 100 and the roller 17. The guide 45 has a guide surface 45a substantially parallel to the direction of arrow β, and the guide surface 45a guides the bill 30 in the direction of arrow β.

Figure 4:
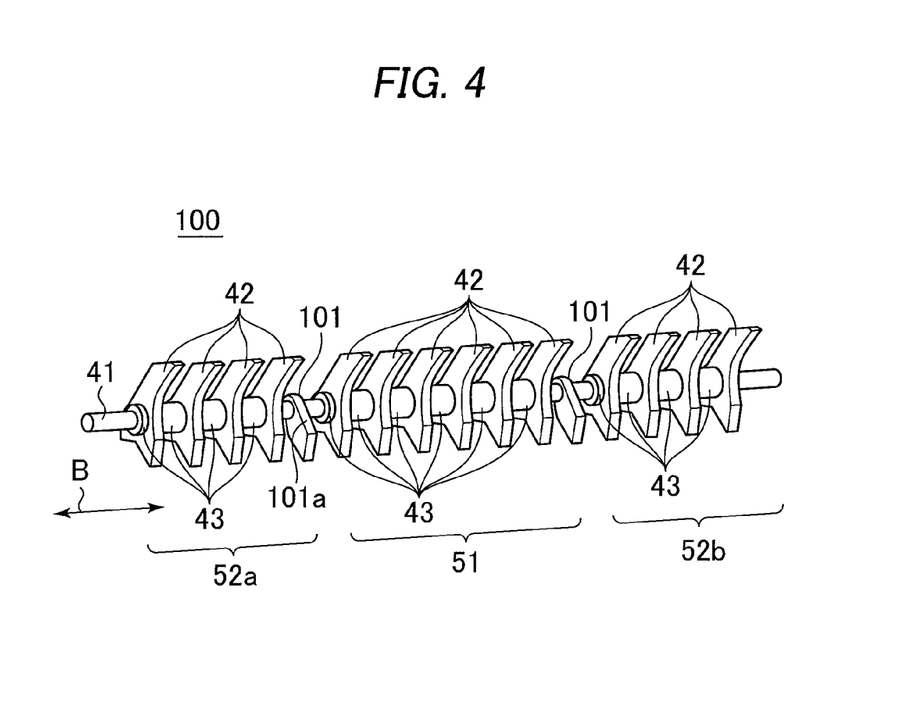
FIG. 4 is a perspective appearance view showing the structure of an embodiment of a conveying direction switching device in accordance with the invention.
Figure 5:
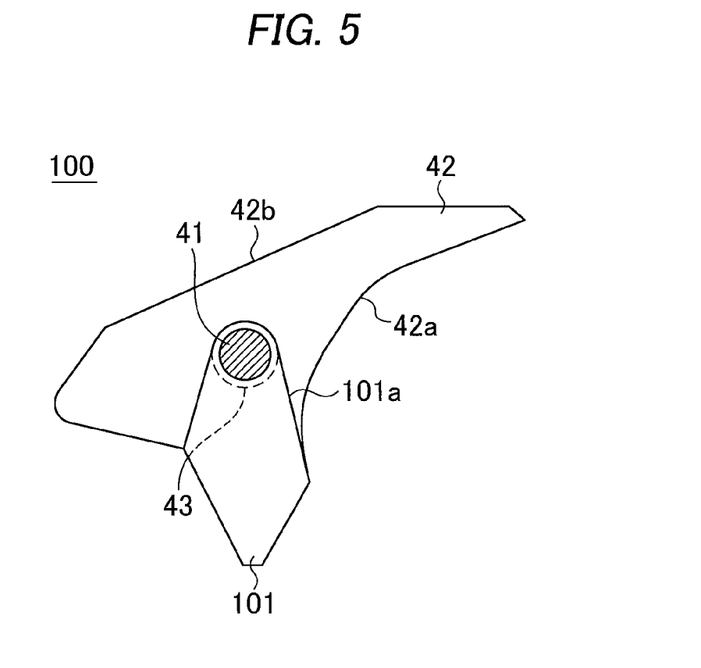
FIG. 5 is a schematic side view of the structure of a primary blade and a auxiliary blade shown together with a cross section of a shaft in its lateral direction in the switching device shown in FIG. 4.

Referring to FIGS. 4 and 5, the structure of the switch 100 will be described. The switch 100 of the present embodiment includes a shaft 41, primary blades 42, bosses 43 and auxiliary blades 101, which are rotatably supported on an immovable portion of the apparatus, such as the casing 1, for example, on a part of the conveying channel 7. The shaft 41 has its longitudinal axis extending in the direction traversing the conveying sections 7b and 7d.

In the embodiment shown in FIG. 4, the primary blades 42 and the bosses 43 are mounted on the shaft 41 as a first blade assembly 51 and second blade assemblies 52a and 52b. The switch 100 may not be limited to the specific structure though.

Each of the first blade assembly 51 and second blade assemblies 52a and 52b include, as can be seen from FIG. 4, a plurality of primary blades 42 fixed to or carried on the shaft 41, and the bosses 43 carried, e.g. fitted, on the shaft 41 between the primary blades 42 and outside the primary blades 42 located outermost. The primary blades 42 stand on the shaft 41 substantially perpendicularly to its longitudinal direction B and in substantially parallel to each other. The boss 43 is a thick, cylindrical member fitted on the shaft 41 to serve as fixing the primary blade 42 onto the shaft 41. In the instant embodiment, the first blade assembly 51 includes six primary blades 42, and each of the second blade assemblies 52a and 52b includes four primary blades 42.

The first blade assembly 51 and the second blade assemblies 52a and 52b in the instant embodiment generally form a fork-like shape. As shown in FIG. 5, each primary blade 42 includes one guide surface 42a which is a surface corresponding to the front of the fork, and the other guide surface 42b which is a surface corresponding to the back of the fork. The one guide surface 42a guides, when the switch 100 is oriented as indicated by the solid line 100 in FIG. 2, a bill 30 from the conveying channel section 7b to the conveying channel section 7d and from the conveying channel section 7d to the conveying channel section 7b. The other guide surface 42b guides, when the switch 100 is oriented as indicated by the dashed line 100a in FIG. 2, a bill 30 from the belt pair 25 to the belt pair 24 or from the belt pair 24 to the belt pair 25.

The second blade assemblies 52a and 52b are, as can be seen from FIG. 4, disposed on the opposite sides of the first blade assembly 51, and the respective innermost blades 42 are spaced apart from the outermost blade 42 of the first blade assembly 51 by a distance corresponding to the width of the belts of the belt pair 25 or more.

Further, in the longitudinal direction B of the shaft 41, in each of shaft sections between the first and second blade assemblies 51 and 52a and between the first and second blade assemblies 51 and 52b, arranged is a auxiliary blade 101. The auxiliary blades 101 stand, e.g. are mounted, on the shaft 41 substantially perpendicularly to its longitudinal direction B.

The switch 100 is arranged such that the belts 21 pass in the longitudinal direction B of the shaft 41 through the shaft sections between the first and second blade assemblies 51 and 52a and between the first and second blade assemblies 51 and 52b, that is, through the sections where the auxiliary blades 101 are arranged so as for the shaft 41 to pass between, and substantially in parallel to, the rollers 14 and 15.

The auxiliary blades 101 in the instant embodiment are, as seen from FIG. 5, a plate with a generally rhombic planer shape, of which one tip portion has the shaft 41 fitted therein so as to extend in the direction from the shaft 41 along the conveying channel section 7d. The auxiliary blade of the embodiment may be substantially equal in thickness to the primary blade 42, and about one quarter in cross-sectional area as broad as the primary blade 42, but may not be limited thereto. In the present embodiment, each section between the first and second blade assemblies includes one auxiliary blade 101. However, plural auxiliary blades may be arranged in each section as necessary.

Figure 6:
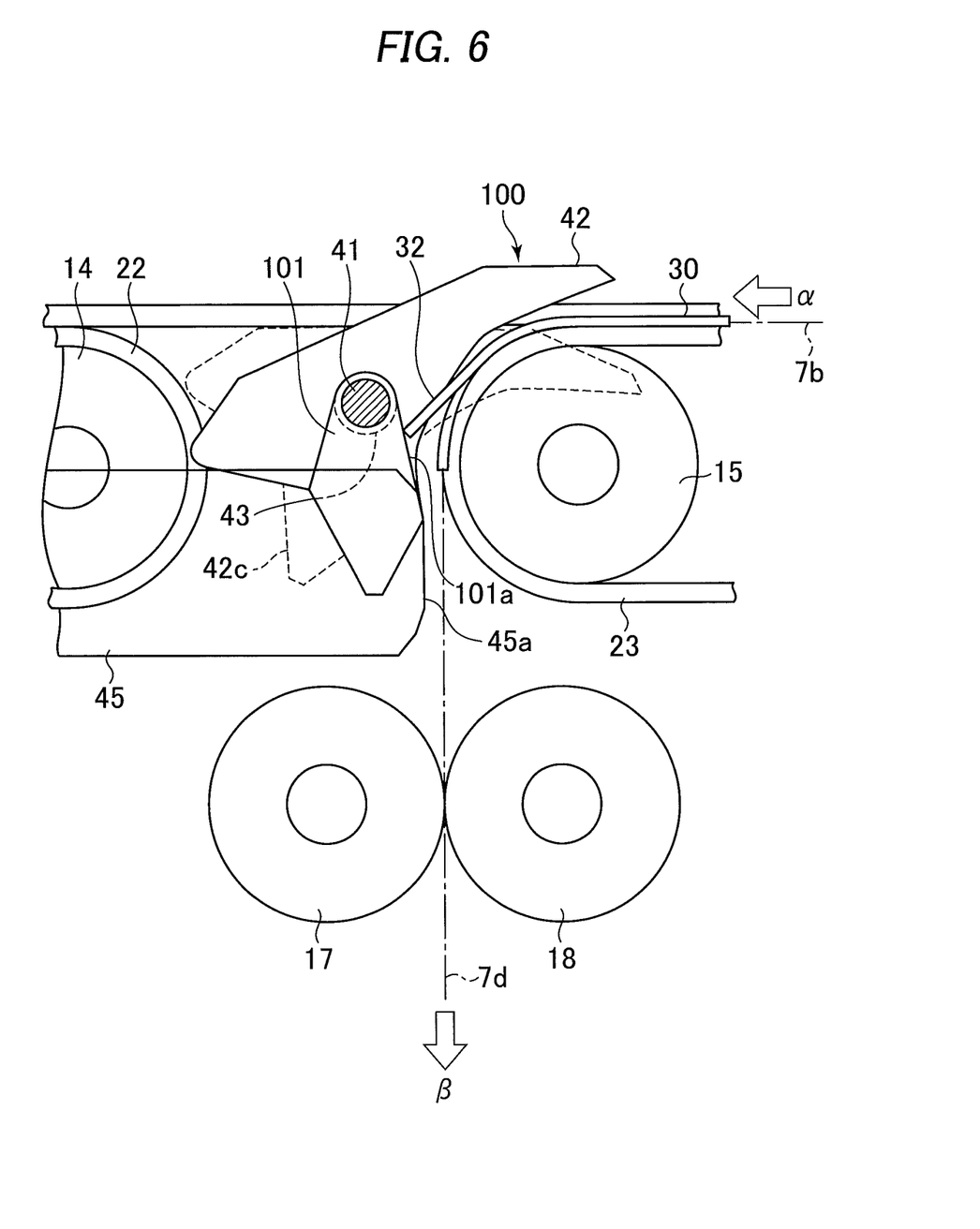
FIG. 6 is a partially enlarged side view showing how the conveying direction of a bill is switched by the switching device shown in FIG. 4.

The auxiliary blades 101 in the instant embodiment are mounted on the shaft 41 with such a positioning that, as shown in FIG. 6, when the blades 42 are oriented as indicated by the solid line 42 in the figure, that is, as switching the conveying direction of a bill 30 from the direction of arrow α to the direction of arrow β, the auxiliary blades 101 protrude in the direction of arrow β from the shaft 41, i.e. downward in the figure while the outer peripheries thereof do not protrude from the outer peripheries of the primary blades 42 outwardly, as viewed in the axial direction of the shaft 41, i.e. in the direction perpendicular to the paper sheet of the figure, without touching the belts 21, 22 and 23. The auxiliary blade 101 may be of any other shapes that do not interrupt the conveyance of bills 30.

The auxiliary blade 101 includes a guide surface 101a, and the guide surface 101a is adapted to guide that part of a bill 30 which passes between the first and second blade assemblies in the direction of arrow β. The guide surface 101a is not necessarily parallel to the direction of arrow β, i.e. the conveying direction, but may incline, as shown in FIG. 6, from the shaft 41 toward the guide surface 45a of the conveying guide 45.

Referring to FIG. 6, the operation of the switch 100 in the instant embodiment will be described. When the conveying direction of bills 30 is switched from the direction of arrow α to the direction of arrow β, the blades 42 are brought into the orientation indicated by the solid line 42 in FIG. 6. A bill 30 conveyed over the conveying channel section 7b in the direction of arrow α is guided toward the guide surface 45a of the conveying guide 45 along the guide surfaces 42a of the blades 42.

Figure 7:
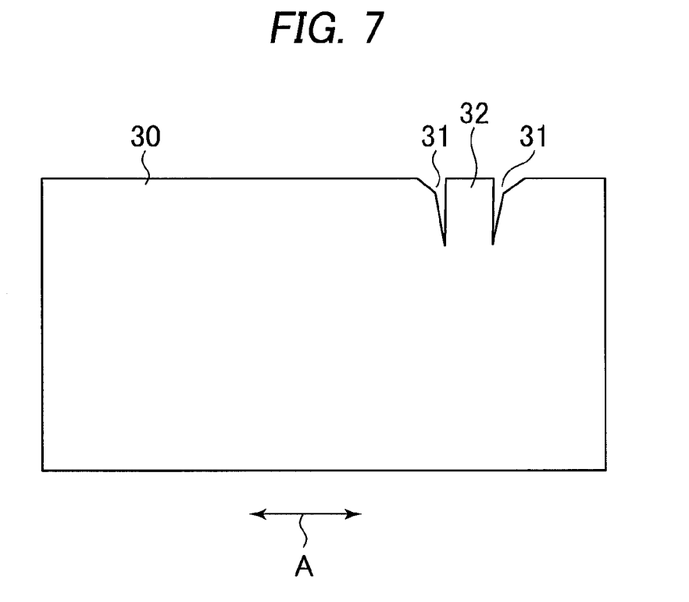
FIG. 7 is a plan view showing one example of a bill with breaks.

When a bill 30, having breaks 31 as shown in FIG. 7, has a residue region 32 in between the two breaks 31 passing the section between the first blade assembly 51 and the second blade assembly 52a or 52b, the region 32 is not restrained by the primary blade 42, so that it tends to lean out in the direction toward the shaft 41. The region 32 is, however, directed toward the guide surface 45a of the conveying guide 45 by the guide surface 101a of the auxiliary blade 101.

The bill 30, having the region 32, is guided to the rollers 17 and 18 along the guide surface 45a of the conveying guide 45, and conveyed on the conveying channel section 7d in the direction of arrow β.

In contrast, when a bill 30 is conveyed from the belt pair 25 to the belt pair 24, the primary blades 42 are brought into the orientation indicated by the dashed line 42c in FIG. 6. The bill 30 conveyed over the conveying channel section 7b in the direction of arrow α is conveyed toward the belt pair 24 along the guide surfaces 42b of the blades 42.

In short, the use of the switch 100 of the instant embodiment can guide that region 32 toward the conveying channel section 7d by means of the auxiliary blades 101 which would otherwise deviate toward the shaft 41 without being guided along the guide surfaces 42a of the primary guides 42. Thus, bills 30, when switched in the conveying direction, would not have the region 32 thereof deviate from the conveying channel 7 to be folded or broken, thus not causing a jam.

The auxiliary blades 101 of the instant embodiment can be provided in existing switches. That can prevent the difficulties caused by switching the conveying direction of bills 30 at lower costs than when the entire switching device is newly designed.

Figure 8:
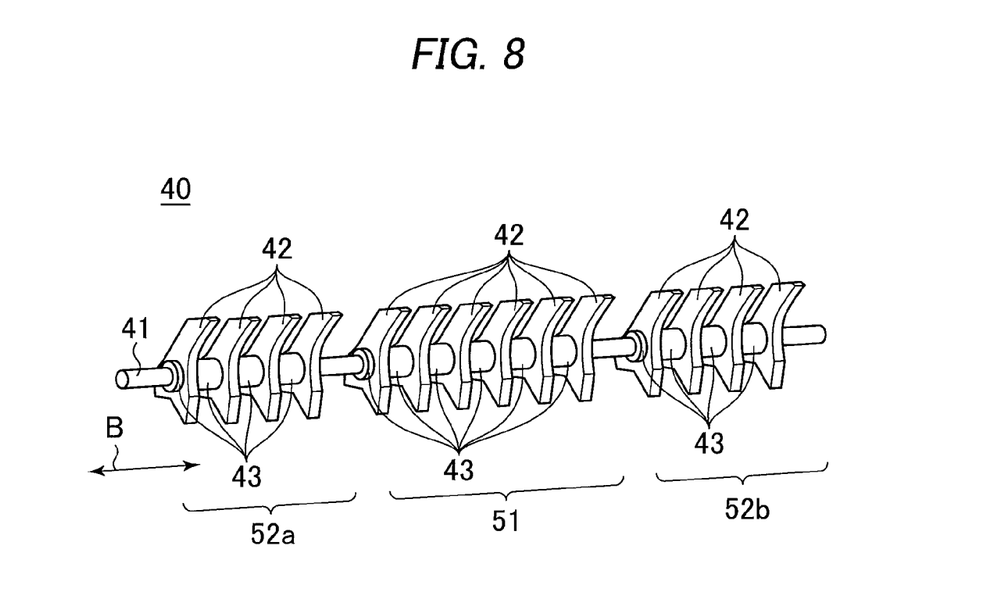
FIG. 8 is a perspective appearance view showing the structure of a conveying direction switching device in a comparative example.
Figure 9:
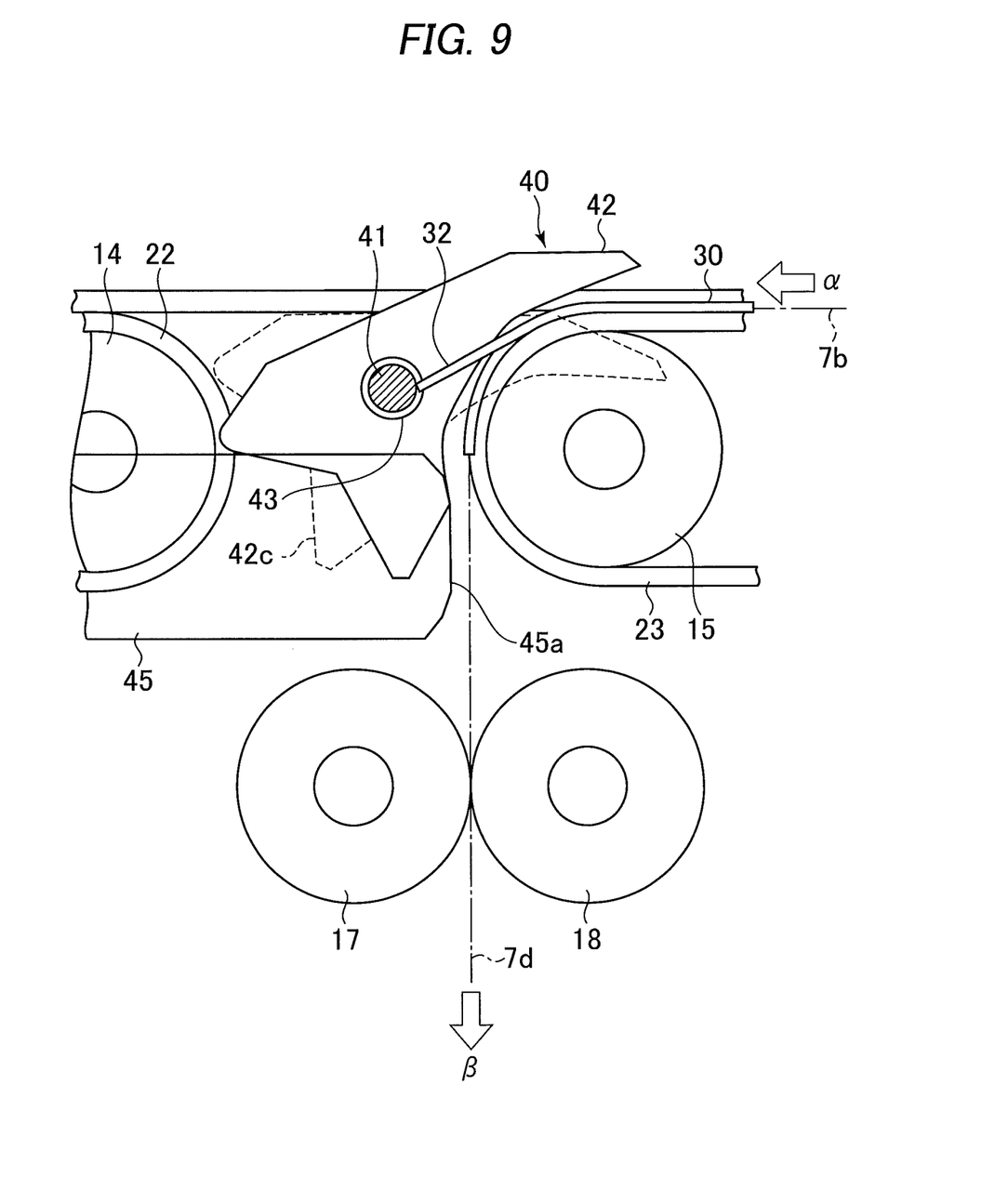
FIG. 9 is a partially enlarged side view, like FIG. 6, showing how the conveying direction of a bill is switched by the switching device shown in FIG. 8.
Figure 10:
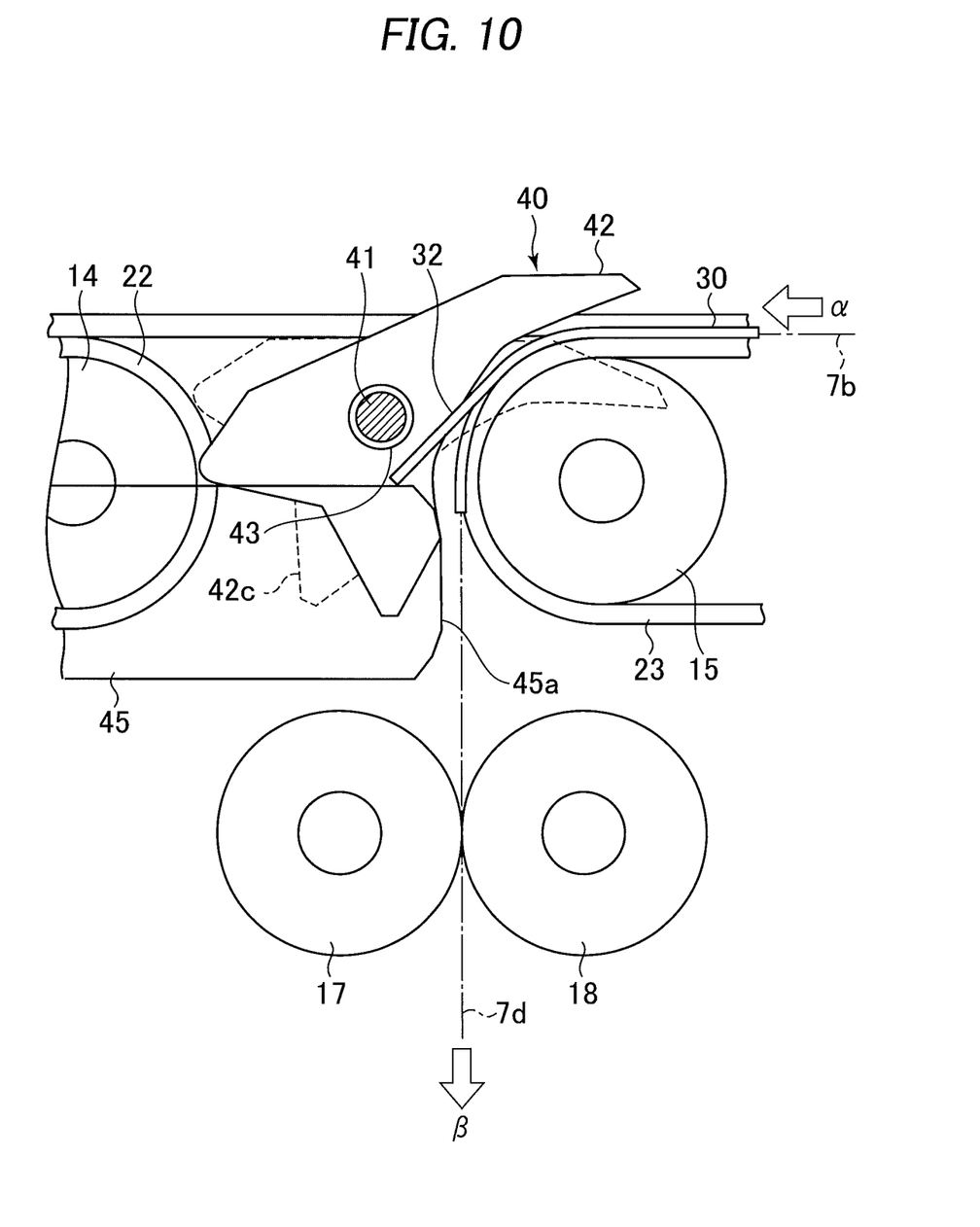
FIG. 10 is a partially enlarged side view, like FIG. 9, showing how the conveying direction of a bill is switched in another way by the switching device shown in FIG. 8.

Now, referring to FIGS. 8, 9 and 10 as a comparative example, description will be made on a switch 40 having no auxiliary blades provided between the first blade assembly 51 and second blade assemblies 52a and 52b. In FIGS. 8 to 10, components like those disclosed in FIGS. 4 and 6 are designated by the same reference numerals.

When the switch 40 shown in FIG. 8 is used to switch the conveying direction of a bill 30 having the region 32, the region 32 may be stuck in between the first blade assembly 51 and the second blade assemblies 52a and 52b to deviate from the conveying channel 7. Then, the region 32 may be brought into contact with the shaft 41 as shown in FIG. 9, or part, other than the guide surface 45a, of the conveying guide 45 as shown in FIG. 10. As a result, the bill 30 may be folded or broken, or stuck in the apparatus.

Figure 11:
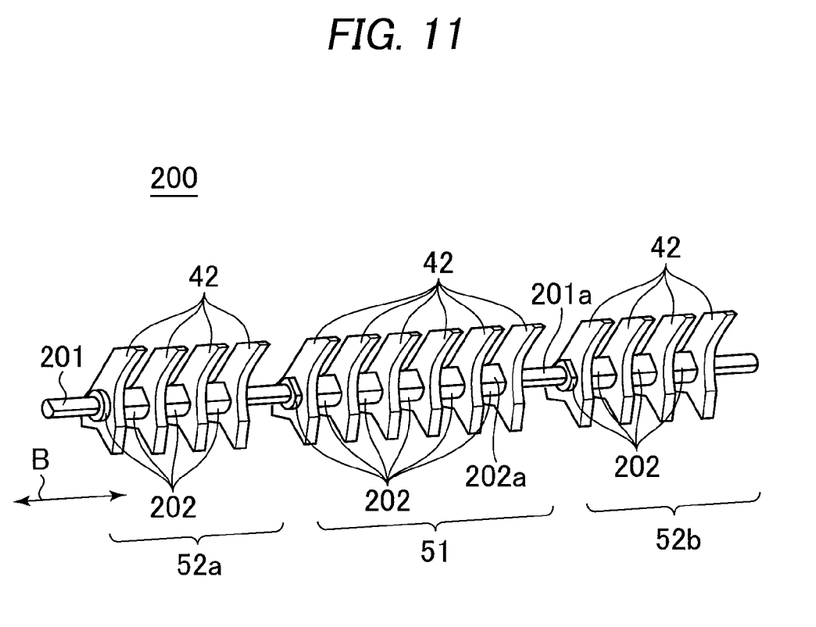
FIG. 11 is a perspective appearance view, like FIG. 4, showing the structure of an alternative embodiment of a conveying direction switching device in accordance with the invention.
Figure 12:
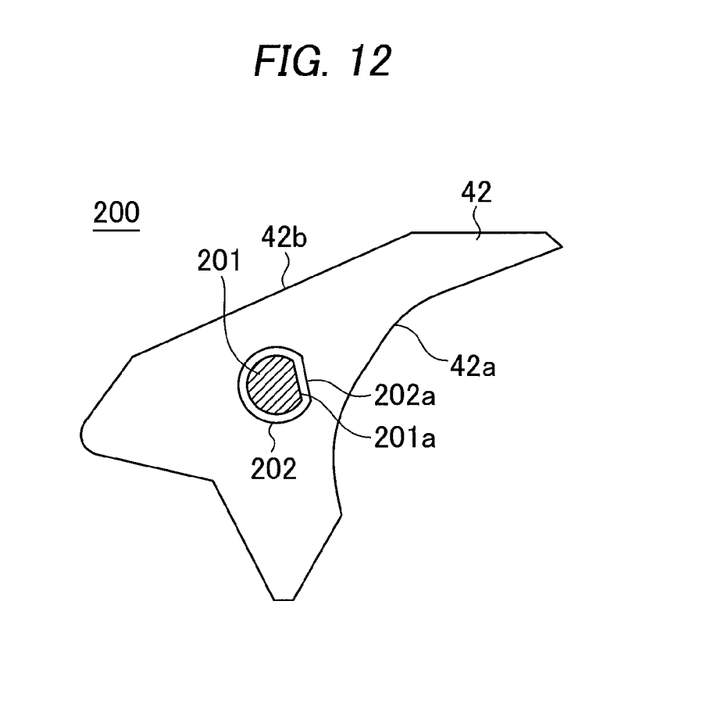
FIG. 12 is a schematic side view, like FIG. 5, showing the structure of a primary blade and a auxiliary blade with a boss shown together with a cross section of a shaft in its lateral direction in the switching device shown in FIG. 11.
Figure 13:
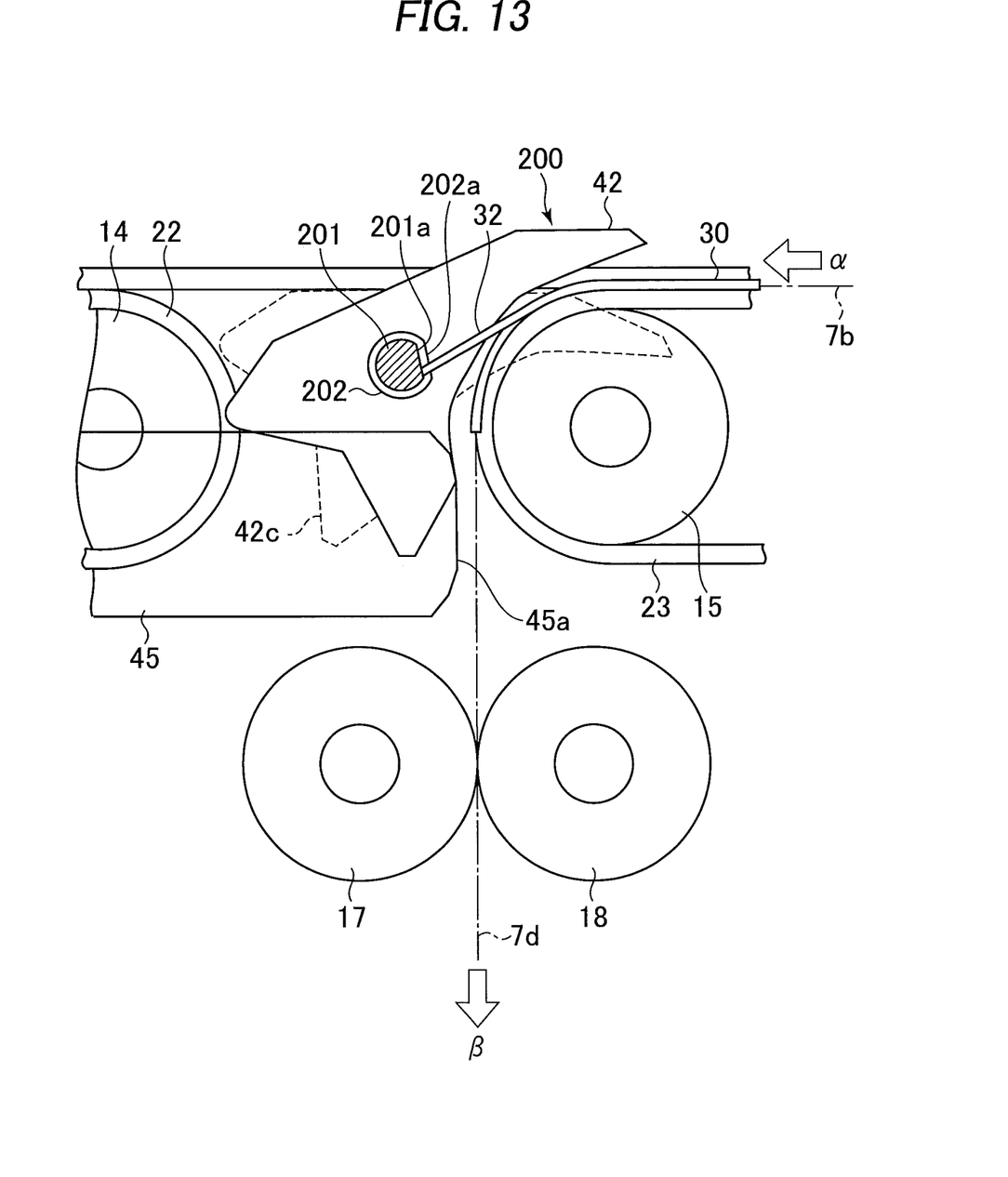
FIG. 13 is a partially enlarged side view, like FIG. 6, showing how the conveying direction of a bill is switched by the switching device shown in FIG. 11.

Next, referring to FIGS. 11 to 13, a switch according to an alternative embodiment of the invention will be described. In FIGS. 11 to 13, the components like those shown in FIGS. 4, 5 and 6 are designated by the same reference numerals. In the embodiment shown in FIG. 11, the structure of the surroundings of the branch section other than the switch may be the same as the embodiment shown in FIG. 2.

A switch 200 of the alternative embodiment includes a shaft 201, and a first blade assembly 51 and second blade assemblies 52a and 52b which stand, e.g. are fitted, on the shaft 201. The second blade assemblies 52a and 52b are disposed on the opposite sides of the first blade assembly 51, and the innermost blade 42 of each of the second blade assemblies is spaced apart from the outermost blade 42 of the first blade assembly 51 by a distance corresponding to the width of the belts of the belt pair 25 or more.

Like the first and second blade assemblies shown in FIG. 4, the first blade assembly 51 and the second blade assemblies 52a and 52b include a plurality of blades 42, and bosses 202 fitted on the shaft 201 between the blades 42 and on the outside of the outermost blades 42.

The switch 200 of the alternative embodiment is not provided with a auxiliary blade. Instead, a strip-like guide surface 201a is formed on the outer peripheral surface of the shaft 201 to extend in the longitudinal direction B of the shaft 201. The guide surface 201a plays the role similar to the guide 101a of the auxiliary blades 101. Thus, the cross section of the shaft 201 substantially perpendicular to the axial direction B in the alternative embodiment has a generally D-shape, as shown in FIG. 12, formed with part of a circle cut straight.

The shaft 201 is fixed to the blades 42 in such a positional relationship that, as shown in FIG. 13, when the blades 42 are oriented as indicated by the solid line 42 in the figure, that is, as switching the conveying direction of bills 30 from the direction of arrow α to the direction of arrow β, the guide surface 201a is positioned in parallel or substantially parallel to the direction of arrow β.

When the blades 42 are oriented as indicated by the solid line 42 in FIG. 13, the guide surface 201a of the shaft 201 may not be in parallel or substantially parallel to the direction of arrow β, but, for example, as shown in FIG. 13, maybe slanted from the shaft 201 toward the guide surface 201a of the conveying guide 45.

The bosses 202 have a guide surface 202a formed, in the alternative embodiment, on the outer periphery of the thick, cylindrical member, and its cross section substantially perpendicular to the axial direction of the bosses 202 has a generally D-shape formed with part of a circle cut straight. The bosses 202 have the inner edge thereof formed, in the embodiment, in the shape corresponding to the contour of the shaft 201, and the shaft 201 is fitted in the bosses 202 such that the guide surfaces 202a of the bosses 202 remain substantially in parallel to the guide surface 201a of the shaft 201.

In the alternative embodiment, both the shaft 201 and the bosses 202 have the guide surfaces 201a and 202a formed thereon. Alternatively, only either of the shaft 201 and bosses 202 may have the guide surface 201a or 202a formed.

Next, the operation of the switch 200 in the alternative embodiment will be described. When the conveying direction of bills 30 is switched from the direction of arrow α to the direction of arrow β, the blades 42 are oriented as indicated by the solid line 42 in FIG. 13. Bills 30 conveyed over the conveying channel section 7b in the direction of arrow α are guided to the guide surfaces 45a of the conveying guides 45 along the guide surfaces 42a of the blades 42. A bill 30 has the region 32 left behind cut, FIG. 7, and, when the region 32 enters the section between the blades 42, the region 32 tends to deviate toward the shaft 201. The region 32 is, however, guided toward the guide surfaces 45a of the conveying guides 45 by the guide surface 201a of the shaft 201 or the guide surfaces 202a of the bosses 202. The bill 30 with the region 32 is guided to the rollers 17 and 18 along the guide surfaces 45a of the conveying guides 45, and conveyed over the conveying channel section 7d in the direction of arrow β.

By contrast, when the conveying direction of bills 30 is not switched from the direction of arrow α to the direction of arrow β, the blades 42 take the orientation indicated by the dashed like 42c in FIG. 13. Bills 30 conveyed over the conveying channel section 7b in the direction of arrow α are guided toward the belt pair 24 along the guide surfaces 42b of the blades 42.

In short, the switch 200 of the alternative embodiment can guide the region 32 of a bill 30, when entering the area between the first blade assembly 51 and the second blade assemblies 52a and 52b, in the conveying direction of the bill 30 by the guide surface 201a of the shaft 201 or the guide surfaces 202a of the bosses 202. Therefore, bills 30, when switched in the conveying direction, would not have the region 32 thereof deviate from the conveying channel 7 to be folded or broken, thus not causing a jam.

Furthermore, also when the region 32 of a bill 30 enters the section between the blades 42 of the first blade assembly 51, the guide surfaces 202a of the bosses 202 provided between the blades 42 guide the region 32 of the bill 30 in the conveying direction of the bill.

The gate 200 of the alternative embodiment can thus much more ensure the switching of the conveying direction of bills 30.

Figure 14:
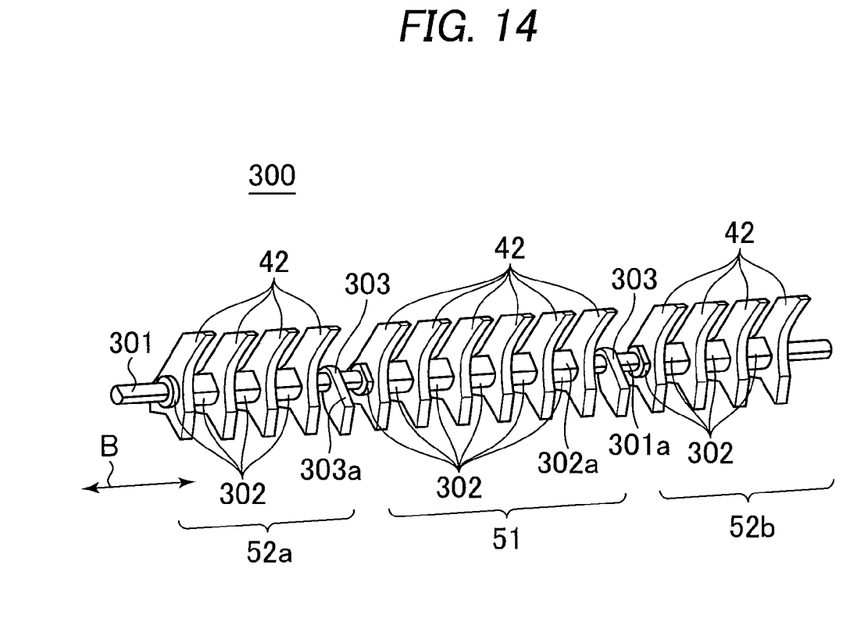
FIG. 14 is a perspective appearance view, like FIG. 4, showing the structure of an alternative embodiment of a conveying direction switching device in accordance with the invention.
Figure 15:
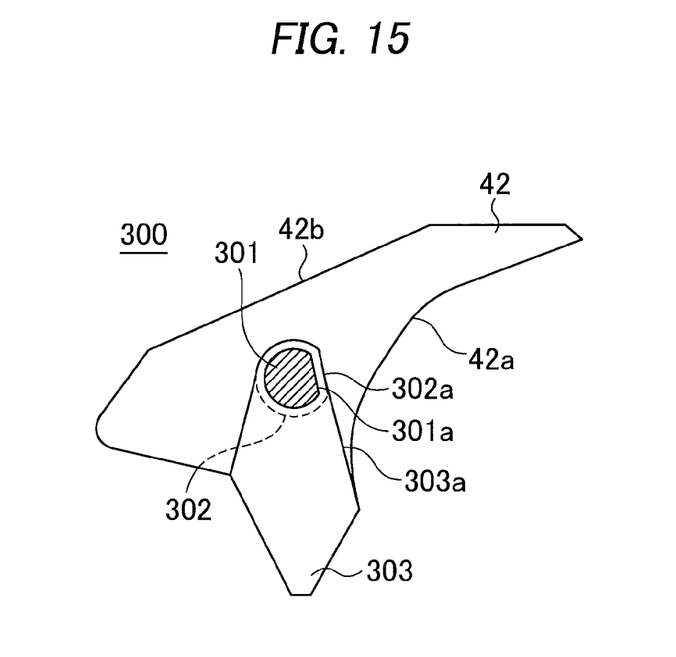
FIG. 15 is a schematic side view, like FIG. 4, showing the structure of a primary blade and a auxiliary blade shown together with a cross section of a shaft in its lateral direction in the switching device shown in FIG. 14.
Figure 16:
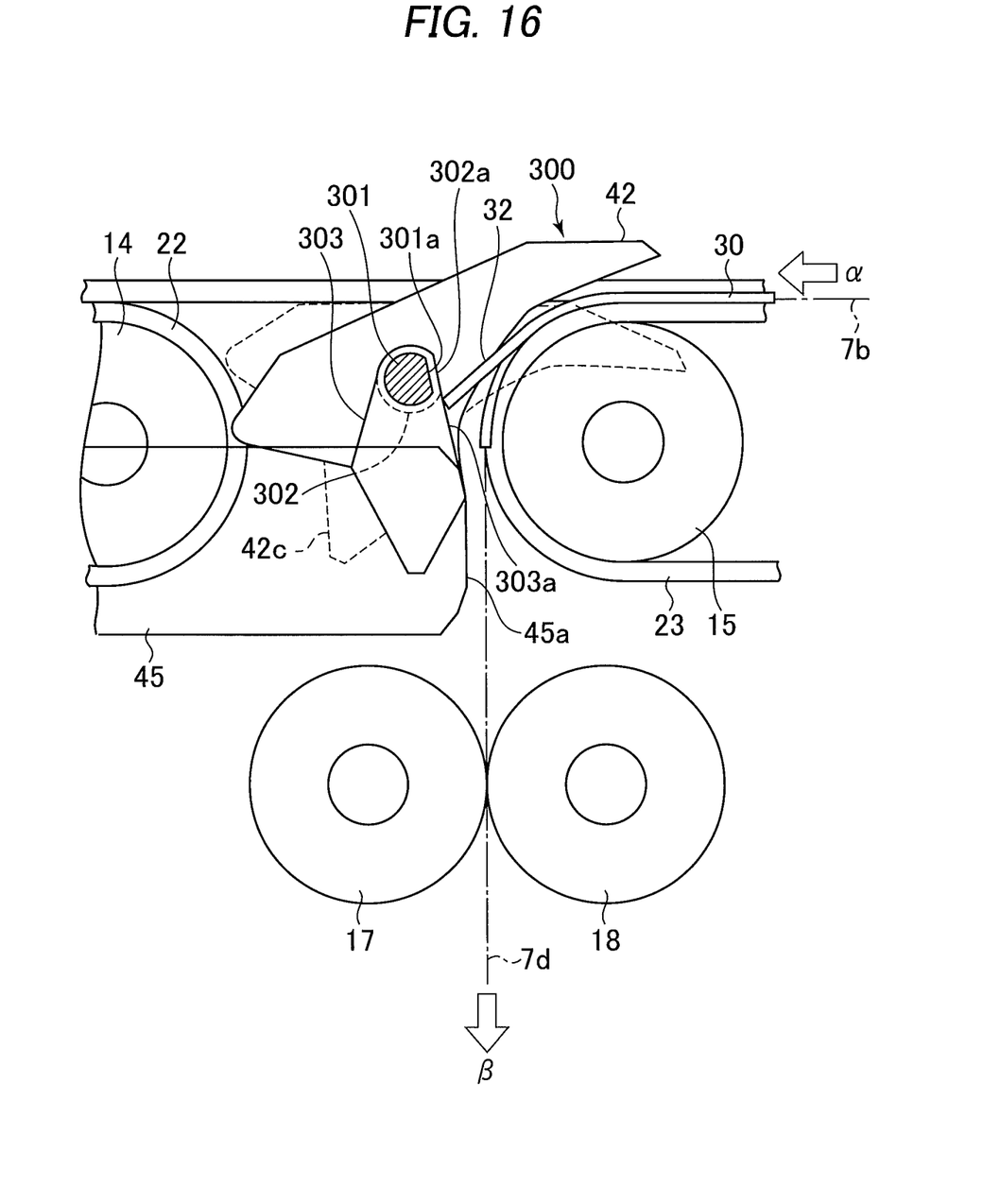
FIG. 16 is a partially enlarged side view, like FIG. 6, showing how the conveying direction of a bill is switched by the switching device shown in FIG. 14.

Next, referring to FIGS. 14, 15 and 16, description will be made on another alternative embodiment of the switch in accordance with the invention. In FIGS. 14, 15 and 16, components like those of FIGS. 4, 5 and 6 are designated by the same reference numerals.

A switch 300 of the other alternative embodiment includes a shaft 301 and bosses 302. The shaft 301 and the bosses 302 have respective guide surfaces 301a and 302a formed thereon, like the shaft 201 and bosses 202 in the embodiment shown in FIG. 12.

Further, the switch 300 is arranged such that, in the longitudinal direction B of the shaft 301, the shaft sections between the first and second blade assemblies 51 and 52a and between the first and second blade assemblies 51 and 52b have respective auxiliary blades 303 mounted on the shaft 301, which are similar to the auxiliary blades 101 in the embodiment shown in FIG. 4.

The shaft 301 may be of a shape like that of the shaft 201, for example, its cross section being generally of a D-shape, and has a strip-like guide surface 301a formed on its outer periphery to extend in the longitudinal direction. The shaft 301 is fitted in the blades 42 such that, when the blades 42 are oriented as indicated by the solid line 42 in FIG. 16, that is, when the conveying direction of bills 30 is switched from the direction of arrow α to the direction of arrow β, the guide surface 301a is rendered in parallel or substantially parallel to the direction of arrow β.

The bosses 302 may have a shape similar to the contour of the bosses 202, FIG. 12, that is, the cross section substantially perpendicular to the axial direction of the bosses 202 may generally be of a D-shape to thereby form the guide surface 302a. The bosses 202 are arranged on the shaft 301 such that the guide surfaces 302a is substantially in parallel to the guide surface 301 of the shaft 301.

In the present alternative embodiment, the auxiliary blades 303 are a plate similar in shape to the auxiliary blades 101, FIG. 5, that is, of a generally rhombic shape. The auxiliary blades 303 may have the thickness thereof substantially equal to that of the primary blades 42 and the primary surface thereof as broad as approximately a quarter of that of the primary blades 42, which may not be limitative. In the alternative embodiment, the auxiliary blades 303 are fitted on the shaft 301 in such a manner that, when the blades 42 are oriented as indicated by the solid line 42 in FIG. 16, that is, when the conveying direction of bills 30 is switched from the direction of arrow α to the direction of arrow β, the auxiliary blades protrude from the shaft 41 in the direction of arrow β, and never render the outer periphery of the shaft beyond, as viewed in the axis direction of the shaft 301, the outer periphery of the blades 42 but the guide surfaces 303a of the auxiliary blades 303 substantially in parallel to the guide surface 301a of the shaft 301.

Of course, the auxiliary blade 303 may be of a different shape as long as the auxiliary blades 303 do not interrupt the conveyance of bills 30, or may be arranged on the shaft 41 in a different way. The guide surfaces 302a of the bosses 302 may be positioned on the same plane as the guide surfaces 303a of the auxiliary blades.

The operation of the switch 300 in the other alternative embodiment will be described below. When switching the conveying direction of bills 30 from the direction of arrow α to the direction of arrow β, the blades 42 are brought into the orientation indicated by the solid line 42 shown in FIG. 16. Bills 30 conveyed over the conveying channel section 7b in the direction of arrow α are guided toward the guide surface 45a of the conveying guide 45 along the guide surface 42a of the blade 42. A bill 30 has the region 32 left behind cut, FIG. 7, and, when the region 32 enters the section between the blades 42, the region 32 tends to deviate toward the shaft 301. The region 32 is, however, guided toward the guide surface 45a of the conveying guide 45 by the guide surface 301a of the shaft 301 or the guide surfaces 302a of the bosses 302. The bill 30 is guided toward the rollers 17 and 18 along the guide surfaces 45a of the conveying guides 45, and conveyed on the conveying channel section 7d in the direction of arrow β.

By contrast, when the conveying direction of bills 30 is not switched from the direction of arrow α to the direction of arrow β, the blades 42 take the orientation indicated by the dashed line 42c in FIG. 16. Bills 30 conveyed over the conveying channel section 7b in the direction of arrow α are guided toward the belt pair 24 along the guide surfaces 42b of the blades.

In summary, the switch 300 of the present alternative embodiment can also guide the region 32 of a bill 30 entering between the first blade assembly 51 and the second blade assemblies 52a and 52b in the conveying direction of the bill 30 by the guide surface 301a of the shaft 301, the guide surfaces 302a of the bosses 302 or the guide surfaces 303a of the auxiliary blades 303. Thus, when switching the conveying direction of bills 30, bills 30 can be prevented from being folded or broken, or stuck in the apparatus.

In any of the above embodiments, the shape, size, position and direction of the auxiliary blades may be of any other shapes, sizes, positions and directions as long as the auxiliary blades do not interrupt the conveyance of bills 30. For example, the auxiliary blades may have a convex portion formed to protrude from the shaft 41 in the direction opposite to the direction of arrow β so long as they do not interfere with the belts 21 and 23. The auxiliary blades may have a similar shape to that of the blades 42 and smaller than the blades 42.

The guide surface of the auxiliary blades may be a curved surface, for example, a curved surface formed correspondingly to the shape of the roller 15. The shaft and the bosses may have a curved guide surface.

The auxiliary blades may be positioned on the conveying guide 45. In that case, the auxiliary blades are attached so as to protrude toward the belt 21.

In the embodiment shown in FIG. 11, along the entire shaft 201, the guide surface 201a may be arranged only in the sections between the first and second blade assemblies 51 and 52a and between the first and second blade assemblies 51 and 52b. As to the bosses 202, the guide surfaces 202a may be provided only for the bosses disposed between the first blade assembly 51 and the second blade assembly 52a or 52b. This is also the case with the embodiment shown in FIG. 14.

In the embodiment shown in FIG. 11 also, the guide surface 201a may be provided only in the shaft 201 without providing any guide surfaces on the bosses 202. This is also the case with the embodiment shown in FIG. 14.

In the embodiment shown in FIG. 4, the first and second blade assemblies 51 and 52 may not be limited to the above structure as long as they have the function similar to each other. For example, one cylindrical boss 43 of a predetermined length fitted on the shaft 41, and a plurality of blades 42 arranged on the bosses 43 apart from each other at predetermined intervals may from each of the first and second blade assemblies 51 and 52. For example, the shaft may have its portions outside the outermost blades 42 provided with no bosses 43. Furthermore, the switch may be of any other structure as long as the conveying direction of bills can be switched so as not to interfere with the conveyer mechanism for conveying bills. This is also the case with the other embodiments described so far.

The switch may also be adapted to switch between three or more conveying directions of bills. Note that, when the conveying direction switches steeper with respect to the direction before switched, the region 32 left behind cut of a bill 30 is more likely to protrude upon switching. Therefore, a switch adapted to switch between three or more conveying directions may have auxiliary blades, or the guide surfaces of a shaft or bosses provided in one of the conveying directions which is steeper after switched with respect to the conveying direction before switched.

The auxiliary blades, shaft and bosses may not be limited to the specific forms in the above embodiments as long as they function to guide the region 32 of a bill 30 in the conveying direction in a way similar to those of the above embodiments.

The conveying direction switching apparatus according to the present invention can be applied to various fields, specifically to various apparatuses with a switching mechanism for switching the conveying direction of a medium. The conveying direction switching apparatus according to the present invention may advantageously be applied to machines for dealing as media with sorts of sheet- or strip-like media, e.g. bills, such as an automatic cash transaction machine, an automatic teller machine, a check/deed collection and issuing machine, a bill/check/deed delivery system, a copying machine, a fax machine, a printer, a vending machine and a ticket vending machine.

The conveying direction switching apparatus in accordance with the invention may not be limited to the form of apparatus for conveying a medium by rollers and belt pairs carried over the rollers and each composed of a couple of belts, but may be applied to various types of apparatuses, such as an apparatus for conveying a medium by a single belt, and an apparatus for conveying a medium only by a plurality of rollers.

The conveying direction switching apparatus in accordance with the invention can be applied not only to apparatuses for conveying a kind of sheets, such as bills or paper sheets, but also to a belt conveyor system for conveying parts in a factory and the like with shafts and blades included in the switching apparatus appropriately chosen in size and strength.

In addition, the conveying direction switching apparatus in accordance with the invention can be applied not only to the apparatus for possibly dealing with bills having breaks but also to conventional conveying direction switching apparatuses for dealing with a medium possibly brought into contact with shafts or bosses, or portions other than the guide surface guiding the medium in the conveying direction.

The entire disclosure of Japanese patent application No. 2011-163297 filed on Jul. 26, 2011, including the specification, claims, accompanying drawings and abstract of the disclosure, is incorporated herein by reference in its entirety.

While the present invention has been described with reference to the particular embodiments, it is not to be restricted by the embodiments. It is to be appreciated that so-called those skilled in the art can change or modify the embodiments, arbitrarily combine the embodiments in part or entirety, or partly extract the embodiments, without departing from the scope and spirit of the present invention.

The invention claimed is:

1. A medium handling apparatus, comprising:
a conveying member conveying a medium; and
a switch switching a conveying direction of the medium conveyed by said conveying member, wherein said switch includes:
  a shaft supported on a stationary part of said apparatus that is rotatable between a first rotational position and a second rotational position;
  a first guide member fixed to said shaft and including:
    a first guide surface that guides, when said shaft is in a first rotational position, a medium conveyed by said conveying member in a first direction; and
    a second guide surface that guides, when said shaft is in a second rotational position, the medium in a second direction, different from the first direction, to direct the medium to a branching path; and
  a second guide member disposed beside said first guide member in a longitudinal direction of said shaft on a side of the branching path so as not to interfere with said conveying member;
  said second guide member being arranged correspondingly in position to said conveying member; and
  said second guide member including a third guide surface guiding the medium in the second direction.

2. The apparatus in accordance with claim 1, wherein:
said first guide member includes a first plurality of blades standing on said shaft substantially perpendicularly to a longitudinal axis of said shaft and substantially in parallel to each other, each of said first plurality of blades forming the first and second guide surfaces; and
said second guide member including at least one second blade standing on said shaft between said first plurality of blades substantially perpendicularly to the longitudinal axis of said shaft, said second blade being smaller than said first blade, and said second blade having the third guide surface formed.

3. The apparatus in accordance with claim 1, wherein:
said first guide member includes a plurality of blades substantially perpendicular to a longitudinal axis of said shaft and substantially parallel to each other, each of said plurality of blades forming the first and second guide surfaces; and
said second guide member including a boss fitted on said shaft to fix said plurality of blades to said shaft, the third guide surface including a substantially flat surface formed on a peripheral surface of said boss to extend in the longitudinal direction of said shaft.

4. A media handling apparatus comprising:
a shaft rotatable between a first rotational position and a second rotational position;
a first guide member fixed to said shaft and including:
  a first guide surface that guides, when said shaft is in a first rotational position, a medium conveyed by a conveying member in a first direction; and
  a second guide surface that guides, when said shaft is in a second rotational position, the medium in a second direction, different from the first direction, to direct the medium to a branching path; and
a second guide member formed on said shaft beside said first guide member in a longitudinal direction of said shaft on a side of the branching path so as not to interfere with the conveying member;
said second guide member including a third guide surface guiding the medium in the second direction; and
the third guide surface including a substantially flat surface formed on a peripheral surface of said shaft to extend in the longitudinal direction of said shaft.

* * * * *

UNITED STATES PATENT AND TRADEMARK OFFICE
CERTIFICATE OF CORRECTION

| | |
|---|---|
| PATENT NO. | : 8,985,303 B2 |
| APPLICATION NO. | : 13/991164 |
| DATED | : March 24, 2015 |
| INVENTOR(S) | : Masaaki Okamoto et al. |

It is certified that error appears in the above-identified patent and that said Letters Patent is hereby corrected as shown below:

Title Page:
Item (87), PCT Publication number should be "WO2013/014984" instead of "WO2013/014894"

Signed and Sealed this
Seventh Day of July, 2015

Michelle K. Lee
*Director of the United States Patent and Trademark Office*